(12) United States Patent
Chan

(10) Patent No.: US 12,100,217 B2
(45) Date of Patent: Sep. 24, 2024

(54) DEEP LEARNING-BASED WIRELESS CAMERA SYSTEM WITH COLOR NIGHT VISION

(71) Applicant: Creative Semiconductor Ltd., Hong Kong (CN)

(72) Inventor: Siu Hin Simon Chan, Hong Kong (CN)

(73) Assignee: Creative Semiconductor Ltd., Hong Kong (CN)

( * ) Notice: Subject to any disclaimer, the term of this patent is extended or adjusted under 35 U.S.C. 154(b) by 32 days.

(21) Appl. No.: 18/247,366

(22) PCT Filed: Oct. 28, 2021

(86) PCT No.: PCT/CN2021/127040
§ 371 (c)(1),
(2) Date: Mar. 30, 2023

(87) PCT Pub. No.: WO2022/089535
PCT Pub. Date: May 5, 2022

(65) Prior Publication Data
US 2023/0419673 A1 Dec. 28, 2023

Related U.S. Application Data

(60) Provisional application No. 63/198,573, filed on Oct. 28, 2020.

(51) Int. Cl.
*G06V 20/52* (2022.01)
*G06T 7/11* (2017.01)
(Continued)

(52) U.S. Cl.
CPC ............. *G06V 20/52* (2022.01); *G06T 7/11* (2017.01); *G06T 7/90* (2017.01); *G06V 10/764* (2022.01);
(Continued)

(58) Field of Classification Search
CPC ........ G06V 20/52; G06V 10/764; G06T 7/11; G06T 7/90; G06T 2207/10024;
(Continued)

(56) References Cited

U.S. PATENT DOCUMENTS 11,100,350 B2 * 8/2021 Piette .................... G06V 10/82
2018/0336700 A1 * 11/2018 Gao ........................ G06T 7/337
(Continued)

*Primary Examiner* — Alazar Tilahun
(74) *Attorney, Agent, or Firm* — S&F/WEHRW

(57) ABSTRACT

A wireless camera system with color night vision is provided. The wireless camera system includes a display device and a camera device with a camera view directed in a surveillance direction. The camera device has an image sensor, an infrared filter, a first processor configured to control the image sensor and the infrared filter, and an artificial intelligence (AI) processor. The AI processor is configured to receive images captured by the image sensor, and to determine color components of the images based on a user-dependent training dataset comprising a plurality of daytime-to-nighttime pairs (DNPs). The first processor is configured to control the image sensor to capture daytime images for the surveillance direction, and is further configured to activate the infrared filter and control the image sensor to capture nighttime images for the surveillance direction. The plurality of DNPs is constructed based on the daytime images and the nighttime images.

16 Claims, 9 Drawing Sheets

(51) Int. Cl.
  *G06T 7/90* (2017.01)
  *G06V 10/764* (2022.01)
  *H04N 5/33* (2023.01)

(52) U.S. Cl.
  CPC ..... *H04N 5/33* (2013.01); *G06T 2207/10024* (2013.01); *G06T 2207/20084* (2013.01)

(58) Field of Classification Search
  CPC ............ G06T 2207/20084; H04N 5/33; H04N 23/20; H04N 23/617; H04N 7/183; G08B 21/0208; G06N 3/08
  See application file for complete search history.

(56) References Cited

U.S. PATENT DOCUMENTS

| | | | |
|---|---|---|---|
| 2020/0167972 A1* | 5/2020 | Birnhack | G06N 3/045 |
| 2021/0350180 A1* | 11/2021 | Oleson | G06N 3/09 |
| 2023/0199281 A1* | 6/2023 | Yang | G06V 10/82 |
| | | | 348/164 |

* cited by examiner

DEEP LEARNING-BASED WIRELESS CAMERA SYSTEM WITH COLOR NIGHT VISION

CROSS-REFERENCE TO RELATED APPLICATIONS

This application is the National Stage of International Application No. PCT/CN2021/127040, filed on Oct. 28, 2021, which claims priority to U.S. Provisional Patent Application No. 63/198,573, filed on Oct. 28, 2020, the disclosure of which is incorporated by reference herein in its entirety.

FIELD OF THE INVENTION

The present disclosure relates broadly, but not exclusively, to a wireless camera system with color night vision. In particular, the present disclosure relates to using deep learning models to evaluate images from a wireless camera system and determine the color components of a low light image.

BACKGROUND OF THE INVENTION

The present invention is motivated by the need for a wireless camera system for monitoring a newborn baby, an infant, or a toddler, that can display colored images in a very low light intensity environment.

The wireless camera systems are widely used for security, surveillance, and other monitoring applications such as indoor home monitoring of newborn babies, infants, or toddlers. The conventional night vision mode in a wireless camera system records data using 940 nm infrared light emitting diodes (LED). The infrared LEDs can illuminate the surroundings in order to generate a grayscale video image even when the environment is dark or low in light.

However, due to the non-color nature of the night vision video images, the details in the image are limited and not clear. In particular, abnormal or accidental conditions, such as stains, vomit, or blood, cannot be recognized effectively from the monochrome video images.

Further, the images captured under the night vision mode are not simply the grayscale versions of the images captured during daytime. The scaling of each pixel is not directly proportional. The primary colors (red, green, blue) show different sensitivity during a low light intensity environment, which causes complexity in developing an effective approach for evaluating the color components.

Accordingly, there is a need in the art to have a wireless camera system with color night vision that can evaluate images and determine the color components of a low light image. Furthermore, other desirable features and characteristics will become apparent from the subsequent detailed description and the appended claims, taken in conjunction with the accompanying drawings and this background of the disclosure.

SUMMARY OF THE INVENTION

In the light of the foregoing background, it is an objective of the present disclosure to provide a wireless camera system with color night vision. Preferably, such wireless camera system can be used for security, surveillance, and other monitoring applications such as indoor home monitoring of newborn babies, infants, or toddlers.

In accordance with the first embodiment of the present disclosure, a wireless camera system with color night vision is provided. The wireless camera system includes a display device and a camera device with a camera view directed in a surveillance direction. The camera device has an image sensor, an infrared filter, a first processor configured to control the image sensor and the infrared filter, and an artificial intelligence (AI) processor. The AI processor is configured to receive images captured by the image sensor, and to determine color components of the images based on a user-dependent training dataset comprising a plurality of daytime-to-nighttime pairs (DNPs). The first processor is configured to control the image sensor to capture daytime images for the surveillance direction, and is further configured to activate the infrared filter and control the image sensor to capture nighttime images for the surveillance direction. The plurality of DNPs is constructed based on the daytime images and the nighttime images.

In accordance with a further aspect of the present disclosure, each individual DNP of the plurality of DNPs comprises a first color component derived from the daytime images, and a second color component derived from the nighttime images, wherein the first color component and the second color component are mapped based on a relative position on the camera view.

In accordance with a further aspect of the present disclosure, the first and second color components are respectively linked to a first image quality (IQ) profile and a second IQ profile.

In accordance with a further aspect of the present disclosure, the plurality of DNPs is classified according to the first and second IQ profiles of the individual DNP.

In accordance with a further aspect of the present disclosure, the first and second IQ profiles are determined by an environmental light intensity obtainable by the image sensor, and selected from a profile library storing plural default IQ profiles.

In accordance with a further aspect of the present disclosure, the color components of the image having a third IQ profile is computed by the AI processor based on a machine learning algorithm trained by the user-dependent training dataset, whereby a plurality of relevant DNPs is selected from the plurality of DNPs by comparing the third IQ profile with the second IQ profile, such that the plurality of relevant DNPs is used to recolor the image in accordance with a predetermined IQ profile.

In accordance with a further aspect of the present disclosure, the machine learning algorithm is a deep neural network (DNN) algorithm.

In accordance with a further aspect of the present disclosure, the daytime images and the nighttime images are segmented into a plurality of patches determined by the relative position.

In accordance with a further aspect of the present disclosure, the AI processor is respectively connected to the image sensor, the infrared filter, and a first processor for processing the images and controlling the camera device.

In accordance with a further aspect of the present disclosure, the display device and the camera device are communicatively connected together using a wireless interface.

In accordance with a further aspect of the present disclosure, the camera view is fixed for allowing the user-dependent training dataset to be constructed.

In accordance with the second embodiment of the present disclosure, a wireless camera system comprising a display device and a camera device with a camera view directed in a surveillance direction. The camera device includes an image sensor, an infrared filter, and a first processor configured to control the image sensor and the infrared filter. The display device comprises an AI processor configured to receive images captured by the image sensor and the infrared filter of the camera device, and to determine color components of the images based on a user-dependent training dataset comprising a plurality of DNPs. The first processor is configured to control the image sensor to capture daytime images for the surveillance direction, and is further configured to activate the infrared filter and control the image sensor to capture nighttime images for the surveillance direction. The plurality of DNPs is constructed based on the daytime images and the nighttime images.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

Figure 1:
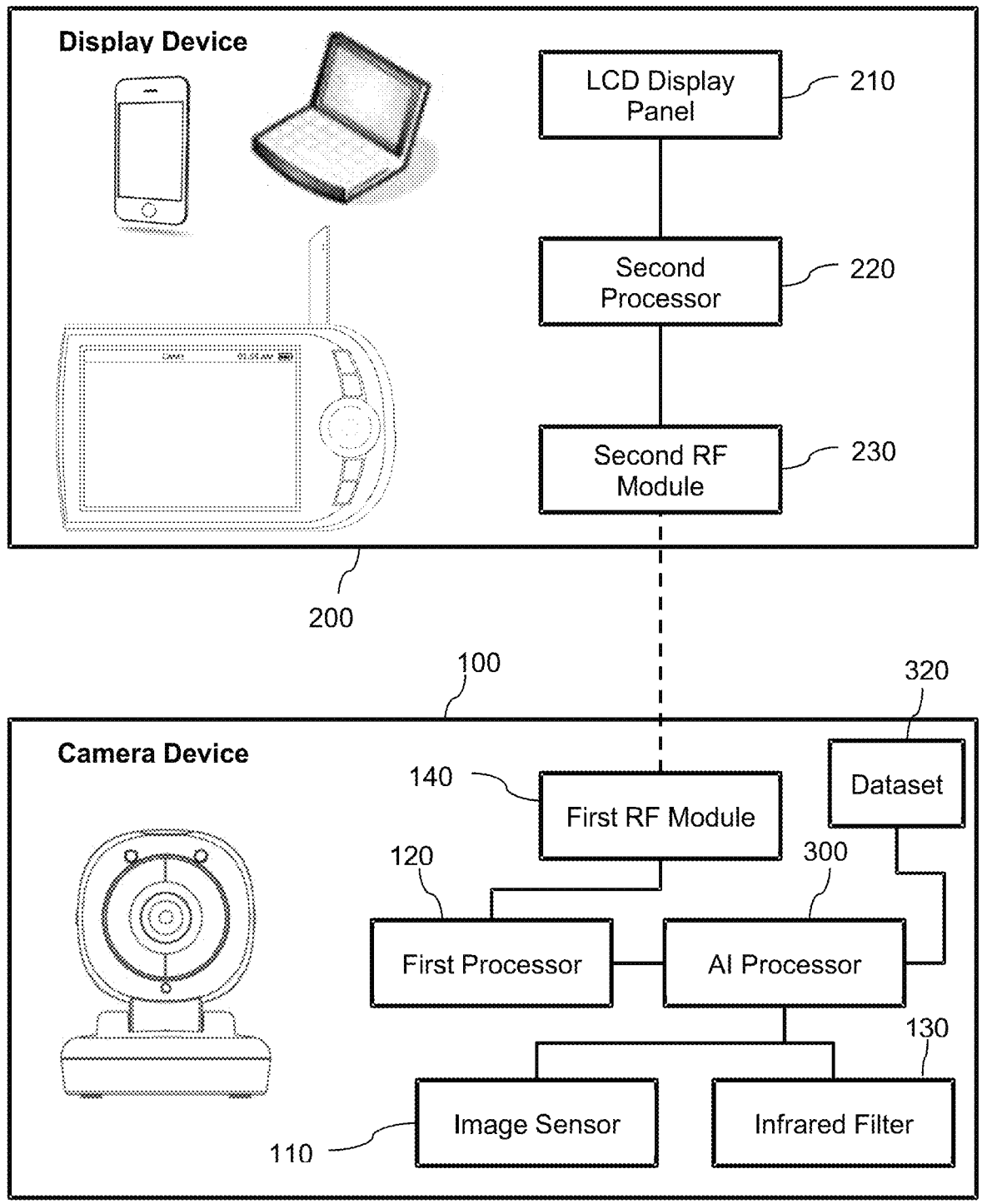
FIG. 1 is a system block diagram illustrating the wireless camera system with color night vision in accordance with the first embodiment of the present disclosure.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

Unless defined otherwise, all technical and scientific terms used herein in the specification shall have the same meaning as commonly understood by one of ordinary skill in the art to which the present invention belongs.

The term "deep neural network" or "DNN", as used herein, means an artificial neural network with more than two layers.

The term "processor", as used herein, is intended to include any integrated circuit or other electronic device or devices capable of performing an operation of at least one instruction. The processor includes, but is not limited to, microcontroller unit (MCU), central processing unit (CPU), digital signal processor (DSP), microprocessor, multi-core processor, and the like.

Unless specifically stated otherwise, and as apparent from the following, it will be appreciated that throughout the present specification, discussions utilizing terms such as "classifying", "compressing", "constructing", "determining", "receiving", "retrieving", "segmenting", "training", "optimizing", or the like, refer to the action and processes of a computer system, or similar electronic device, that manipulates and transforms data represented as physical quantities within the computer system into other data similarly represented as physical quantities within the computer system or other information storage, transmission or display devices.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to the desired result. The steps are those requiring physical manipulations of physical quantities, such as electrical, magnetic, or optical signals capable of being stored, transferred, combined, compared, and otherwise manipulated.

The present specification also discloses apparatus for performing the operations of the methods. Such apparatus may be specially constructed for the required purposes or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of a more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer-readable medium. The computer-readable medium may include storage devices such as hard disk drive storage devices, non-volatile memory (e.g., flash memory or other electrically programmable read-only memory configured to form a solid-state drive), volatile memory (e.g., static or dynamic random access memory), and so forth. The computer program when loaded and executed on such a computer effectively results in an apparatus that implements the steps of the preferred method.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The benefits, advantages, solutions to problems, and any element(s) that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims as issued.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to illuminate the invention better and does not pose a limitation on the scope of the invention unless the claims expressly state otherwise.

In light of the background and the problem stated therein, embodiments of the present invention disclose a wireless camera system with color night vision for solving or at least improving the existing problem with respect to color detection in a very low light intensity environment. More specifically, but without limitation, the present disclosure uses deep learning algorithms to evaluate images from a wireless camera system and determine the color components of a low light image. It is understandable to those skilled in the art that the present disclosure aims to provide accurate estimations and predictions of the color components in the one or more images captured by a wireless camera. This can be performed by using deep learning algorithms and/or other machine learning algorithms known in the art, such as, for example, neural networks, decision tree, Hidden Markov models, Bayesian networks, and kernel methods.

In the conventional system, the wireless camera comprises a 940 nm infrared light emitting diodes (LED) to illuminate the surroundings in order to generate a grayscale video image. The disclosed system is configured with deep learning algorithms for obtaining color images even when the environment is dark. Particularly when used as a baby monitor, the parents can have a better view of their child under the surveillance.

FIG. 1 shows an exemplarily wireless camera system 10 with color night vision in accordance with certain embodiments of the present disclosure. The wireless camera system 10 comprises a camera device 100 and a display device 200. In certain embodiments, the display device 200 is a stand-alone monitoring device, a smartphone, or a computer. The captured videos and images may be stored in an internal memory of the display device 200, or an external memory that is not integral to the display device 200, such as memory disk, hard-drive, data storage device, memory stick, cloud database, blockchain, and the like. Generally, once the camera device 100 is placed or affixed in a room, the location of the camera device 100 is not going to change frequently. Therefore, the camera view of the camera device 100 is generally fixed and directed in a surveillance direction. This application detail of the camera device 100 is an important prerequisite for enabling the present invention by allowing a user-dependent training dataset 320 to be constructed.

The camera device 100 and the display device 200 are communicatively connected together using a wireless interface, such as 2.4 GHz Frequency-hopping spread spectrum (FHSS), Bluetooth, WiFi, cellular, ZigBee, etc. In certain embodiments, the connection may be wired without departing from the scope and spirit of the present disclosure. In case the display device 200 is a smartphone or a computer, the communication with the camera device 100 may operate through the network, and the data may be stored in a cloud database or a network drive.

The camera device 100 at least includes an artificial intelligence (AI) processor 300, an image sensor 110, an infrared filter 130, a first radio frequency (RF) module 140, and one or more processors, collectively referred to as a first processor 120. The first processor 120 is interconnected to the AI processor 300, which is configured to receive images from the image sensor 110 after activating the infrared filter 130, and to determine the color components of the images received. The image sensor 110 is preferably a high sensitive image sensor, such as complementary metal-oxide semiconductors (CMOS) sensor, or a charge-coupled device (CCD) sensor, that form the core component of the camera. The raw data obtained are image data captured from the high sensitive image sensor. In certain embodiments, the AI processor 300 is integrated into the first processor 120 as a function block.

The display device 200 at least includes a second RF module 230, a LCD display panel 210, and one or more processors, collectively referred to as a second processor 220. The display device 200 and the camera device 100 are communicatively connected together via the first and second RF modules 140, 230 using a wireless interface, which is configured to operate at a predetermined frequency range, and to perform bi-directional data communication by transmitting video data, image data, and/or instruction sets. The communication may require pairing and authentication.

Figure 2:
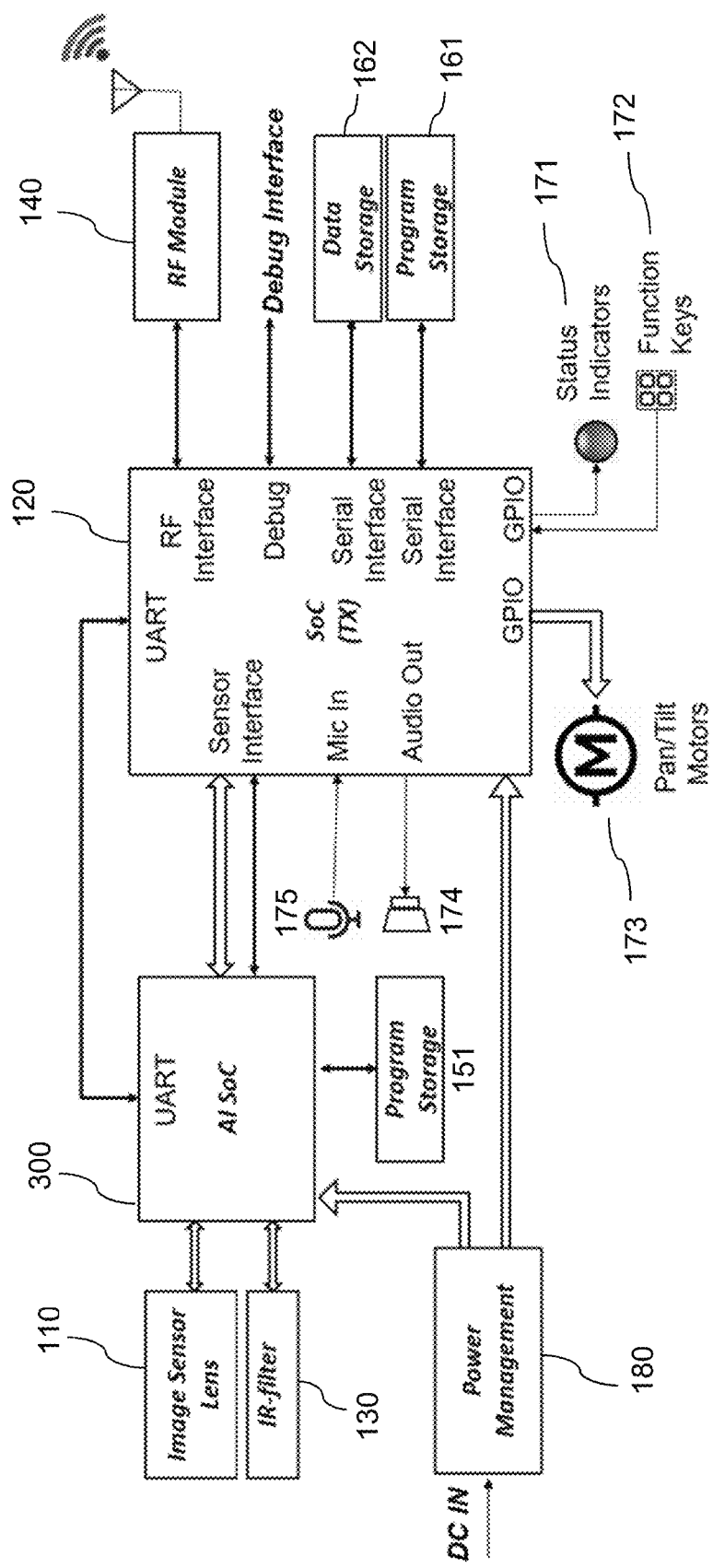
FIG. 2 is a circuit block diagram of the camera device with color night vision in accordance with the first embodiment of the present disclosure.

FIG. 2 shows a detailed circuit block diagram of the camera device 100. The first processor 120 is preferably a silicon-on-chip (SoC), with sensor interface and serial interface. In certain embodiments, the first processor 120 is an image signal processor (ISP) configured to perform post-processing of the raw data from the image sensor 110. The images obtained from the image sensor 110 (with or without activating the infrared filter 130) are coupled to the AI processor 300, and further coupled to the sensor interface of the first processor 120. In certain embodiments, the first processor 120 is configured to control the image sensor 110 to capture daytime images for the surveillance direction. The first processor 120 is further configured to activate the infrared filter 130 and control the image sensor 110 to capture nighttime images for the surveillance direction. Although the terms "daytime image" and "nighttime image" are recited in the present disclosure, the terms shall not be confined literally as images obtained during daytime or nighttime. Instead, the terms are used to refer to images with high or low light intensities.

In the illustrated embodiment, the AI processor 300 is respectively connected to the image sensor 110, the infrared filter 130, and a first processor 120 for processing the images and controlling the camera device. The AI processor 300 and the first processor 120 are synchronized by the Universal Asynchronous Receiver/Transmitter (UART) interface. It is apparent that the connection may be otherwise without departing from the scope and spirit of the present disclosure. For example, the AI processor 300, the image sensor 110, and the infrared filter 130 may be connected to the first processor 120 directly. The received images from the image sensor 110 (with or without activating the infrared filter 130) are coupled to the AI processor 300 via the first processor 120. Therefore, the first processor 120 receives the images and couples the images to the AI processor 300 for determining the color components and adjusting the overall brightness.

The AI processor 300 is connected to a program storage 151, which is a dedicated storage or memory assigned for storing a user-dependent training dataset 320. The user-dependent training dataset 320 may change from time to time and is not shared with other devices or systems. The AI processor 300 is configured to acquire knowledge and train the user-dependent training dataset 320 with respect to the camera view and the respective surveillance direction.

The power management module 180 may include one or more voltage regulators for converting the input DC voltage into different voltage levels for driving the camera device 100.

The camera device 100 further includes status indicator 171, function keys 172, pan/tilt motors 173, one or more speakers 174, and microphone 175. The first processor 120 is also connected to a program storage 161 for storing the software codes, and a data storage 162 for storing any images or video. The data storage 162 may be an external memory, such as a secure digital (SD) card.

Figure 3:
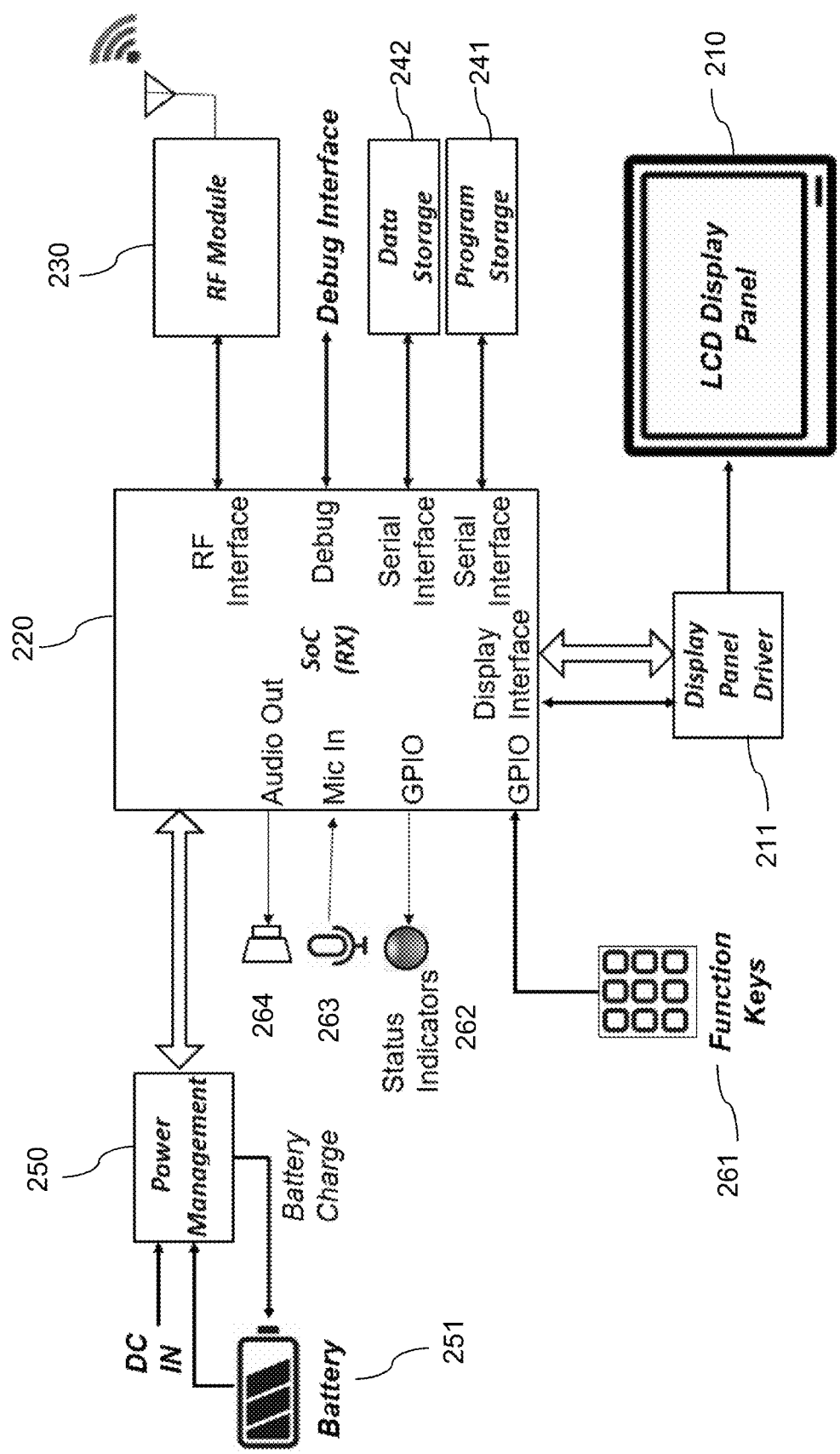
FIG. 3 is a circuit block diagram of the display device in accordance with the first embodiment of the present disclosure.

FIG. 3 shows a detailed circuit block diagram of the display device 200. The second processor 220 is preferably an SoC configured to receive the images from the camera device 100 via the RF module 230. The second processor 220 is connected to a display panel driver 211 for driving a LCD display panel 210. The display panel driver 211 may be bonded to the LCD display panel 210, or otherwise integrated into the second processor 220. The power management 250 and the battery 251 provides power to the second processor 220, the LCD display panel 210, and other components. The display device 200 further includes function keys 261, status indicator 262, one or more speakers 264, and microphone 263. The second processor 220 is also connected to a program storage 241 for storing the software codes, and a data storage 242 for storing any images or video. The data storage 242 may be an external memory, such as an SD card.

Figure 4:
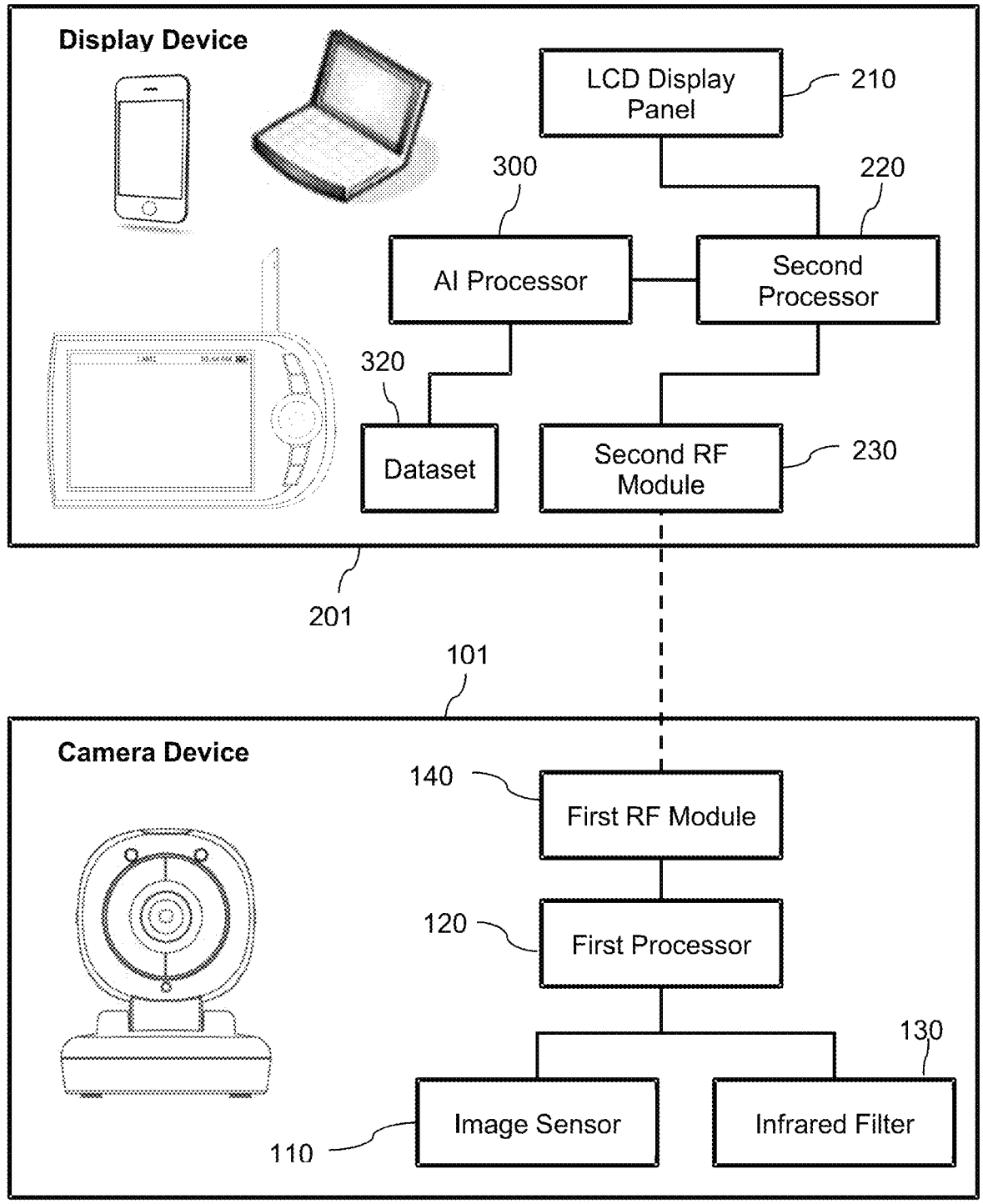
FIG. 4 is a system block diagram illustrating the wireless camera system with color night vision in accordance with the second embodiment of the present disclosure.

A second embodiment of the present invention is illustrated in FIG. 4, which shows an alternative implementation of the wireless camera system 11 with the AI processor 300 provided in the display device 201 instead of the camera device 101. In the alternative system, the AI processor 300 is interconnected to the second processor 220, which is configured to receive images from the image sensor 110, and to determine the color components of the images received. The AI processor 300 may also be provided on a backend system on a cloud server, a network server, or other server infrastructures. The images from the camera device 101 are therefore uploaded to the backend system for performing the computation.

Figure 5A:
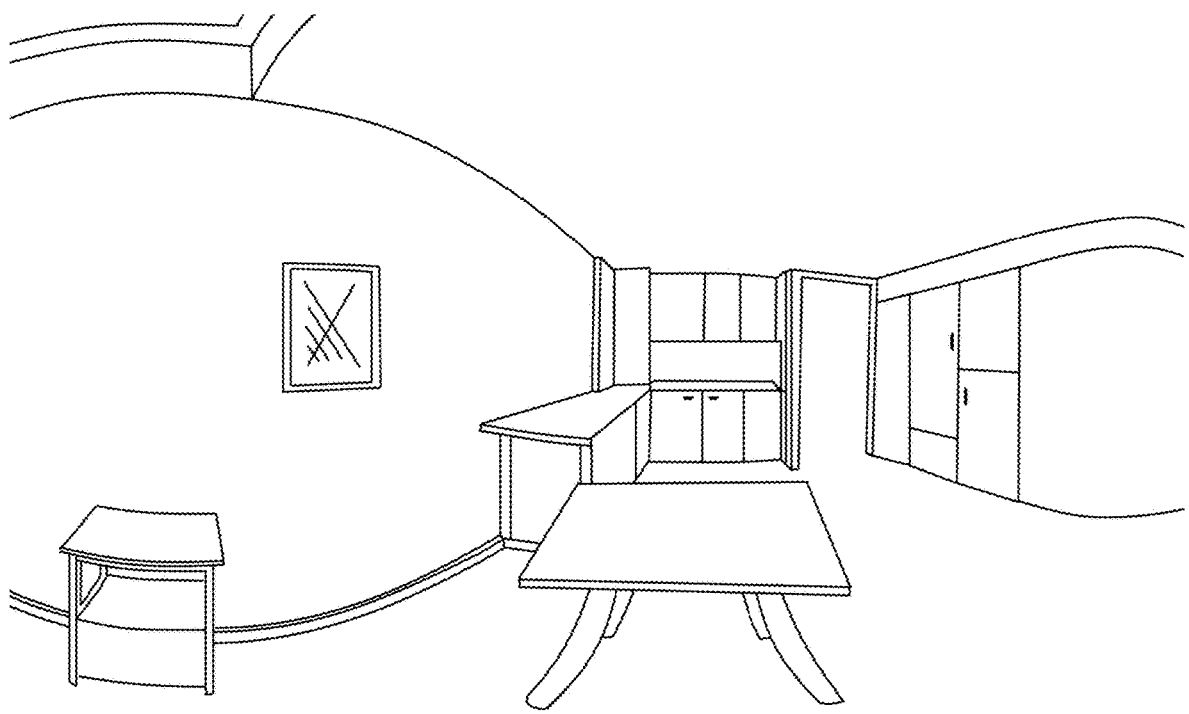
FIG. 5A conceptually illustrates an exemplarily surveillance picture captured of an indoor area in daytime.
Figure 5B:
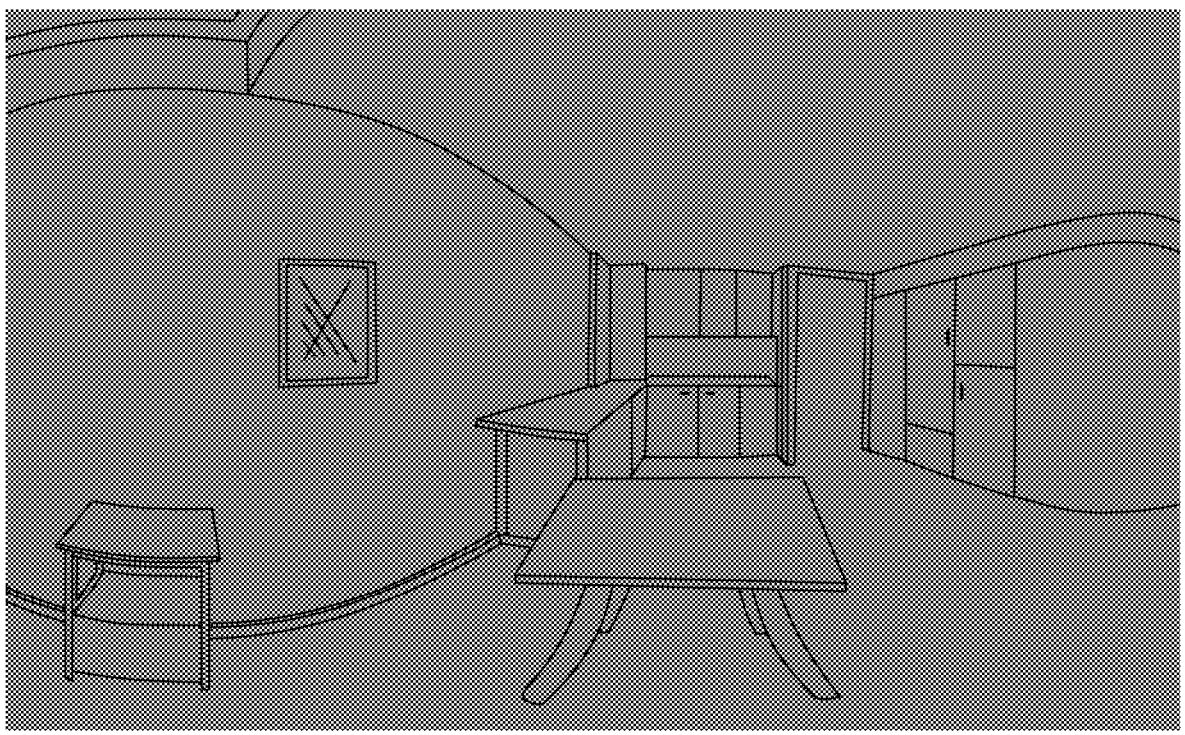
FIG. 5B conceptually illustrates an exemplarily surveillance picture captured of the same indoor area in the nighttime.

FIG. 5A conceptually illustrates an exemplarily surveillance picture captured of an indoor area in daytime, while FIG. 5B conceptually illustrates an exemplarily surveillance picture captured of the same indoor area in the nighttime. Daytime images captured in daytime are generally brighter and can capture detailed colors. Nighttime images captured in nighttime are generally darker, and illuminating an environment with infrared LED will generate a substantially grayscale image. As the location of the camera device 100 is not going to change frequently after the camera device 100 is placed or affixed in a room at a location, the wireless camera system 10 can easily capture a large number of images of the same camera view. The AI processor 300 is developed to correlate the daytime images and nighttime images, such that a new nighttime image captured by the image sensor 110 can be analyzed for determining the corresponding daytime image. In particular, the AI processor 300 is configured to determine the color components of the images based on a user-dependent training dataset 320. The user-dependent training dataset 320 is developed for a particular room and a particular camera view. If the camera device 100 is moved to another location, the user-dependent training dataset 320 should be trained again.

Advantageously, the user-dependent training dataset 320 comprises a plurality of daytime-to-nighttime pairs (DNPs). The plurality of DNPs is constructed based on the daytime images and the nighttime images. With the plurality of DNPs, when an object is moved into the camera view at nighttime, the captured image is analyzed based on the user-dependent training dataset 320 to determine the respective color components, thereby the respective daytime image can be predicted.

Figure 6:
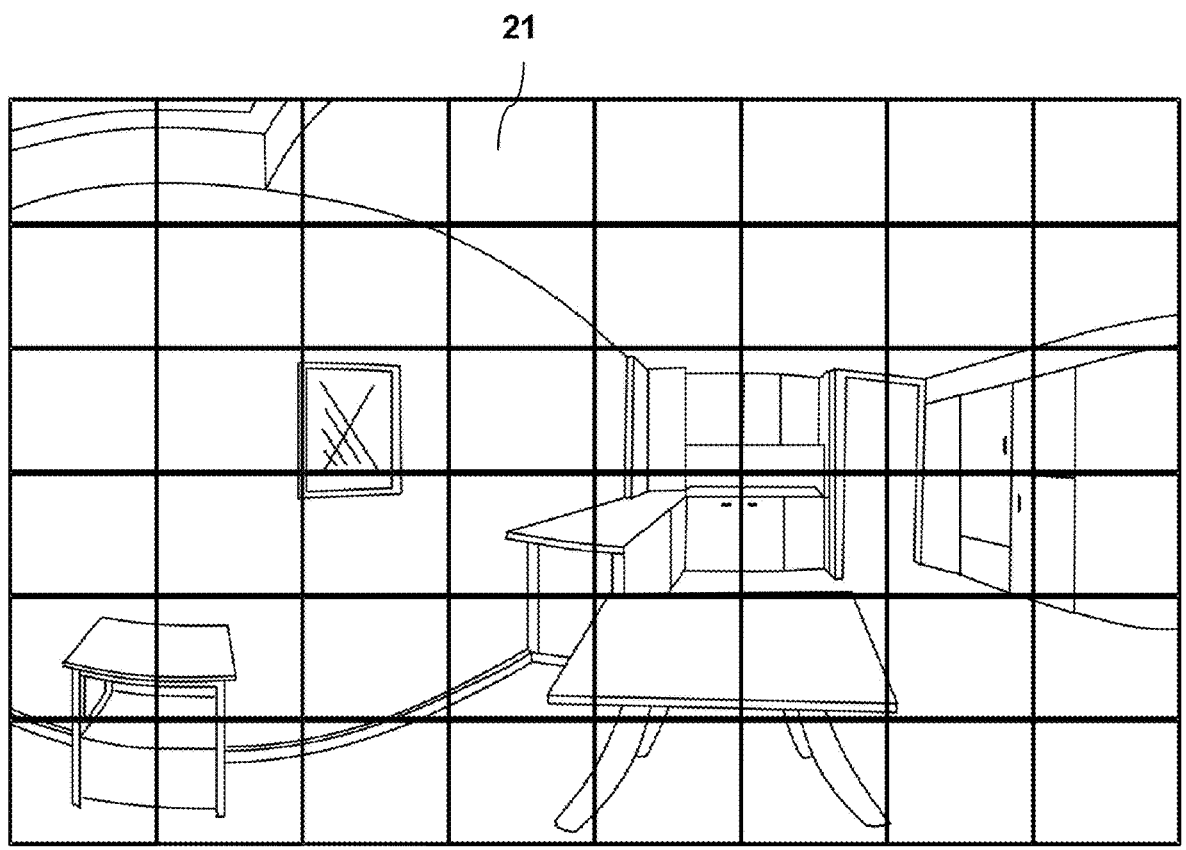
FIG. 6 conceptually illustrates the surveillance picture of FIG. 5A segmented into a plurality of patches.

As shown in FIG. 6, the images obtained from the camera view can be segmented into a plurality of patches 21. The plurality of patches 21 may each have a square shape evenly arranged across the vertical and horizontal direction. Alternatively, the plurality of patches 21 may also have other shapes or be unevenly arranged in accordance with the content of the images. The purpose is to segment the images and analyze the image patch by patch. The use of smaller patches can achieve higher accuracy, but the computation time may be longer and the required storage memory may be larger.

Each individual DNP of the plurality of DNPs comprises a first color component derived from the daytime images, and a second color component derived from the nighttime images. The first color component and the second color component are mapped based on a relative position on the camera view. The relative position is also used to determine the plurality of patches 21.

In order to further quantify the light intensity of the images captured by the image sensor 110, the overall ambient light intensity is detected. The detected ambient light intensity of the environment is measured and compared with a profile library for selecting the image quality (IQ) profile for such an image. Preferably, the first processor 120 is configured to process the raw data for determining the IQ profile. Therefore, the IQ profile is essentially determined by an environmental light intensity obtainable by the image sensor 110. The IQ profile may be used uniformly across all the patches 21 in an image, or locally to some of the patches 21.

The profile library is configured to store plural default IQ profiles. Each IQ profile is associated to one or more light intensities as detected from the image sensor 110. Each IQ profile may include one or more image quality parameters for that particular light intensity conditions, such as color conversion matrix, image saturation, peak signal to noise ratio (PSNR), and intensity to color mapping relationship, and other intensity adjustment parameters. In certain embodiments, the IQ profile may also include one or more other parameters selected from the group consisting auto exposure histogram, auto white balance histogram, autofocus edge window, auto or manual defect-pixel concealment, lens shading compensation for R1G/B channel, wide dynamic range (WDR), configurable 2D or 3D noise reduction, purple fringe suppression, advanced anti-aliasing filter, configurable advanced edge enhancement, programmable gamma table for Y channel, programmable gamma table for RGB correction, programmable hue and saturation, digital image stabilization, highlight or backlight compensation enhance, color interpolation (less false color), individual digital color gain control for R/Gr/Gb/B channels, individual digital color gain control for Y/Cb/Cr channels, pixel offset (optical black) compensation for R/Gr/Gb/B channels, configurable windowing function after processed image, motion detection report, flip and mirror, software watermark, image black blocking (private mask) with 16×12 ROI of full image, programmable color conversion matrix for R/G/B input, and video resizer by clamping, scaler or frame rate drop.

Figure 7A:
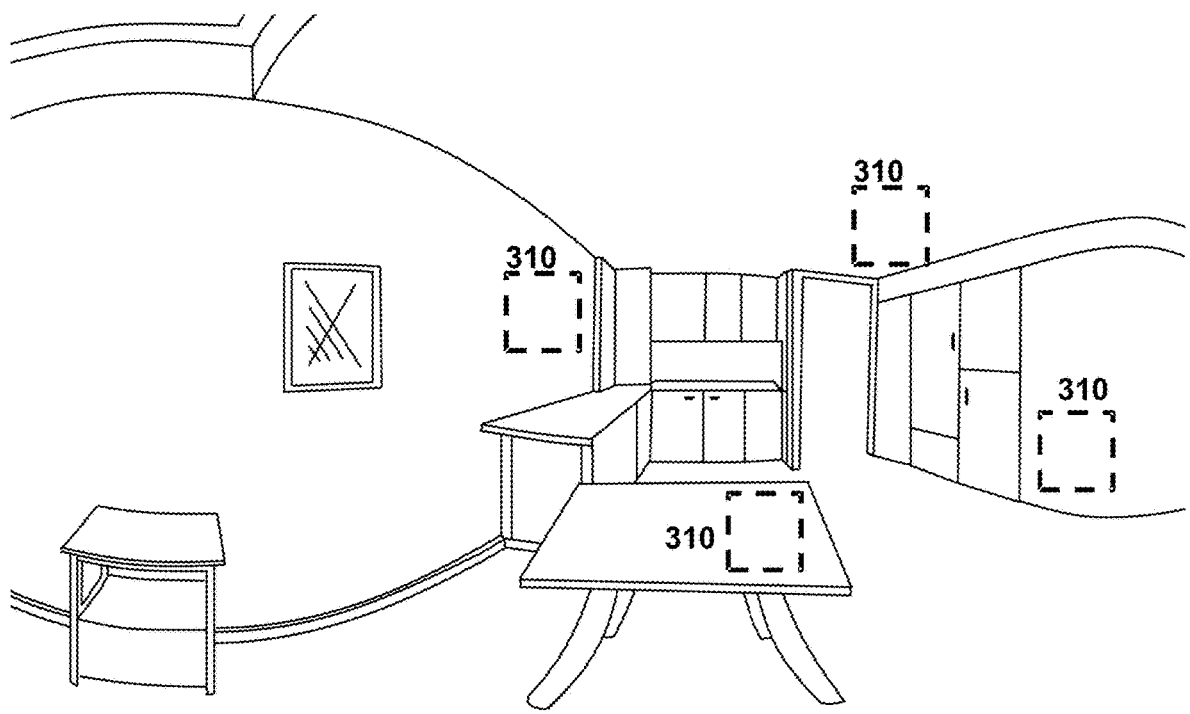
FIG. 7A conceptually illustrates the surveillance picture of FIG. 5A with training features selected.

As conceptually illustrated in FIG. 7A, patches are selected from the daytime image after segmentation. Each selected patch may have the same or substantially the same color. As an example, four patches are selected in the daytime image to demonstrate. Each of the selected patches on the daytime image is labeled by the color component, which is referred to as first color component 310. The first color component 310 is linked to a first IQ profile of the daytime image.

Figure 7B:
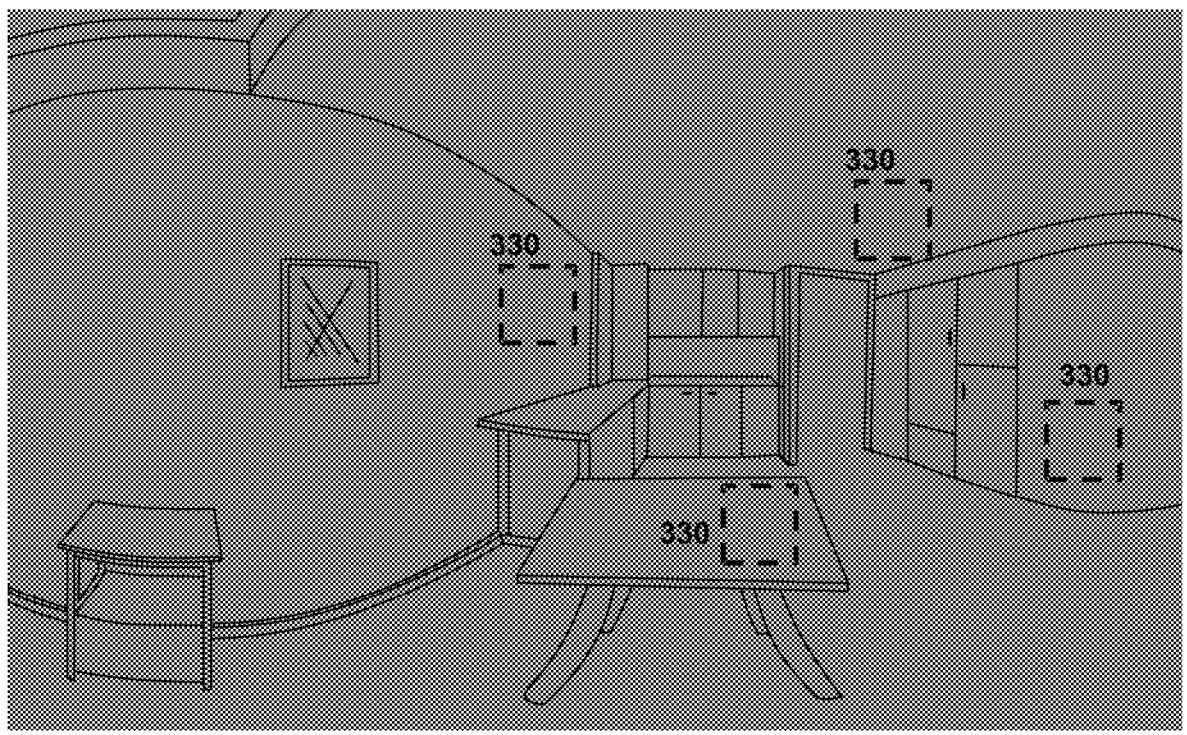
FIG. 7B conceptually illustrates the surveillance picture of FIG. 5B with the same training features selected.

Similarly, as conceptually illustrated in FIG. 7B, patches of the same relative position are selected from the nighttime image. Each of the selected patches on the nighttime image is labeled by the color component, which is referred to as the second color component 330. The second color component 330 is also linked accordingly to a second IQ profile of the nighttime image.

Figure 8:
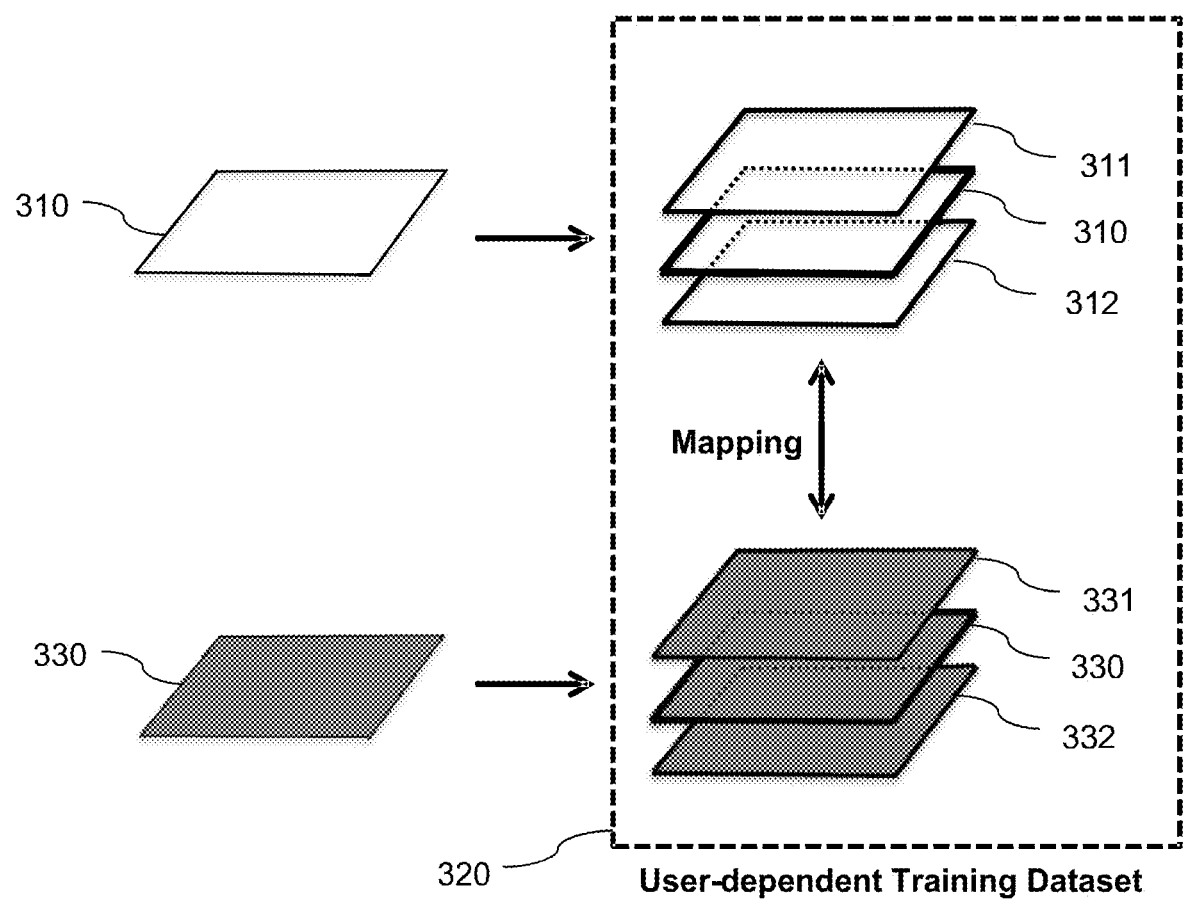
FIG. 8 illustrates the step of patch mapping and training the user-dependent training dataset.

The first and second color components 310, 330 are mapped together as they are referring to the same relative position on the camera view, which is collectively referred to as an individual DNP. As shown in FIG. 8, a new individual DNP is added to the user-dependent training dataset 320. After updating the user-dependent training dataset 320, the first color component 310 is inserted into a list of data having other first color components 311, 312. Similarly, the second component 330 is also inserted into another list of data having other second color components 331, 332. The plurality of DNPs is mapped together and classified according to the first and second IQ profiles of the individual DNP.

Figure 9:
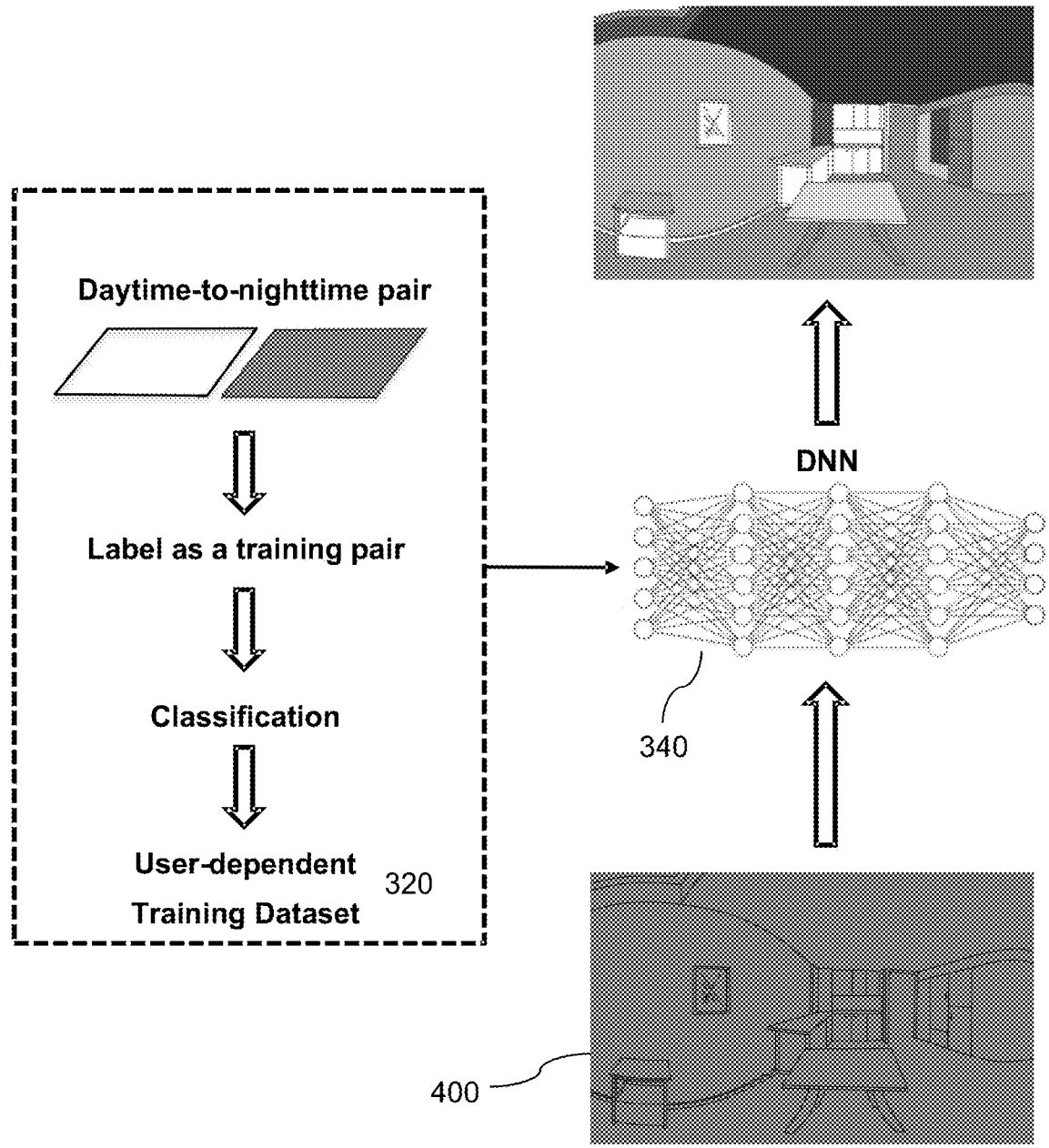
FIG. 9 illustrates the use of the user-dependent training dataset for obtaining a color night vision image in accordance with certain embodiments of the present disclosure.

FIG. 9 shows the use of the user-dependent training dataset for obtaining a color night vision image. To construct the user-dependent training dataset 320, an individual DNP is obtained and labeled as a training pair. The training pair is classified according to the first and second IQ profiles, so that the individual DNP can be stored in the user-dependent training dataset 320. When a new image 400 is captured by the image sensor 110 in the low light environment, the image is analyzed by the AI processor 300. In certain embodiments, the AI processor 300 performs the computation based on a machine learning algorithm trained by the user-dependent training dataset 320. Preferably, the machine learning algorithm is a deep neural network (DNN) algorithm 340 with more than two layers. With a sufficient number of entries of DNPs in the user-dependent training dataset 320, the AI processor 300 can be considered as a well-training DNN.

The color components of the new image 400 have a third IQ profile, which is essential for the AI processor 300 to perform the computation. A plurality of relevant DNPs is selected from the plurality of DNPs in the user-dependent training dataset 320 by comparing the third IQ profile with the second IQ profile. The third IQ profile is not necessarily the same as the second IQ profile in order to be selected as a relevant DNP. The DNN algorithm 340 trained by the user-dependent training dataset 320 can automatically predict the color elements of the new image 400. When a predetermined IQ profile is selected, the plurality of relevant DNPs is used to recolor the new image 400 in accordance with such a predetermined IQ profile.

In case the AI processor 300 is provided in the display device 201, the new image 400 is first transmitted to the display device 201 before the AI processor 300 performs the computation based on the user-dependent training dataset 320.

This illustrates the fundamental wireless camera system having color night vision in accordance with the present disclosure. Particularly, the wireless camera system can determine the color components of a low light image. It will be apparent that variants of the above-disclosed and other features and functions, or alternatives thereof, may be combined into many other different systems or apparatuses. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:
1. A wireless camera system comprising a display device and a camera device with a camera view directed in a surveillance direction, wherein the camera device comprises:
   an image sensor;
   an infrared filter;
   a first processor configured to control the image sensor and the infrared filter; and
   an artificial intelligence (AI) processor configured to receive images captured by the image sensor, and to determine color components of the images based on a user-dependent training dataset comprising a plurality of daytime-to-nighttime pairs (DNPs),
wherein:
the first processor is configured to control the image sensor to capture daytime images for the surveillance direction;
the first processor is further configured to activate the infrared filter and control the image sensor to capture nighttime images for the surveillance direction; and
the plurality of DNPs is constructed based on the daytime images and the nighttime images.

2. The wireless camera system of claim 1, wherein each individual DNP of the plurality of DNPs comprises a first color component derived from the daytime images, and a second color component derived from the nighttime images, wherein the first color component and the second color component are mapped based on a relative position on the camera view.

3. The wireless camera system of claim 2, wherein the first and second color components are respectively linked to a first image quality (IQ) profile and a second IQ profile.

4. The wireless camera system of claim 3, wherein the plurality of DNPs is classified according to the first and second IQ profiles of the individual DNP.

5. The wireless camera system of claim 4, wherein the first and second IQ profiles are determined by an environmental light intensity obtainable by the image sensor, and selected from a profile library storing plural default IQ profiles.

6. The wireless camera system of claim 3, wherein the color components of the image having a third IQ profile is computed by the AI processor based on a machine learning algorithm trained by the user-dependent training dataset, whereby a plurality of relevant DNPs is selected from the plurality of DNPs by comparing the third IQ profile with the second IQ profile, such that the plurality of relevant DNPs is used to recolor the image in accordance with a predetermined IQ profile.

7. The wireless camera system of claim 6, wherein the machine learning algorithm is a deep neural network (DNN) algorithm.

8. The wireless camera system of claim 2, wherein the daytime images and the nighttime images are segmented into a plurality of patches determined by the relative position.

9. The wireless camera system of claim 1, wherein the AI processor is respectively connected to the image sensor, the infrared filter, and a first processor for processing the images and controlling the camera device.

10. The wireless camera system of claim 1, wherein the display device and the camera device are communicatively connected together using a wireless interface.

11. The wireless camera system of claim 1, wherein the camera view is fixed for allowing the user-dependent training dataset to be constructed.

12. A wireless camera system comprising a display device and a camera device with a camera view directed in a surveillance direction, wherein:
the camera device comprises:
an image sensor;
an infrared filter; and
a first processor configured to control the image sensor and the infrared filter;
the display device comprises:
an artificial intelligence (AI) processor configured to receive images captured by the image sensor and the infrared filter of the camera device, and to determine color components of the images based on a user-dependent training dataset comprising a plurality of daytime-to-nighttime pairs (DNPs);
the first processor is configured to control the image sensor to capture daytime images for the surveillance direction;
the first processor is further configured to activate the infrared filter and control the image sensor to capture nighttime images for the surveillance direction; and
the plurality of DNPs is constructed based on the daytime images and the nighttime images.

13. The wireless camera system of claim 12, wherein each individual DNP of the plurality of DNPs comprises a first color component derived from the daytime images, and a second color component derived from the nighttime images, wherein the first color component and the second color component are mapped based on a relative position on the camera view.

14. The wireless camera system of claim 13, wherein the first and second color components are respectively linked to a first image quality (IQ) profile and a second IQ profile.

15. The wireless camera system of claim 14, wherein the plurality of DNPs is classified according to the first and second IQ profiles of the individual DNP.

16. The wireless camera system of claim 15, wherein the color components of the image having a third IQ profile is computed by the AI processor based on a deep neural network (DNN) algorithm trained by the user-dependent training dataset, whereby a plurality of relevant DNPs is selected from the plurality of DNPs by comparing the third IQ profile with the second IQ profile, such that the plurality of relevant DNPs is used to recolor the image in accordance with a predetermined IQ profile.

* * * * *